United States Patent
Spertus et al.

(10) Patent No.: US 7,827,145 B1
(45) Date of Patent: Nov. 2, 2010

(54) LEVERAGING CLIENT REDUNDANCY ON RESTORE

(75) Inventors: Michael Spertus, Chicago, IL (US); Hans Van Rietschote, Sunnyvale, CA (US); Kirk L. Searls, Maitland, FL (US)

(73) Assignee: Symantec Operating Corporation, Mountain View, CA (US)

( * ) Notice: Subject to any disclaimer, the term of this patent is extended or adjusted under 35 U.S.C. 154(b) by 189 days.

(21) Appl. No.: 11/613,781

(22) Filed: Dec. 20, 2006

(51) Int. Cl.
*G06F 17/00* (2006.01)
*G06F 7/00* (2006.01)

(52) U.S. Cl. .................. 707/647; 707/610; 707/679; 707/769; 709/203

(58) Field of Classification Search .............. None
See application file for complete search history.

(56) References Cited

U.S. PATENT DOCUMENTS

| | | | |
|---|---|---|---|
| 6,366,987 B1 * | 4/2002 | Tzelnic et al. | 711/162 |
| 7,149,858 B1 * | 12/2006 | Kiselev | 711/162 |
| 7,290,017 B1 | 10/2007 | Wang et al. | |
| 7,290,101 B1 | 10/2007 | Kekre et al. | |
| 7,389,314 B2 | 6/2008 | Kulkarni et al. | |
| 7,549,032 B1 | 6/2009 | Kekre et al. | |
| 7,596,713 B2 | 9/2009 | Mani-Meitav et al. | |
| 7,617,414 B2 | 11/2009 | Becker et al. | |
| 2006/0230116 A1 * | 10/2006 | Couper et al. | 709/206 |

* cited by examiner

*Primary Examiner*—Greta L Robinson
*Assistant Examiner*—James J Wilcox
(74) *Attorney, Agent, or Firm*—Rory D. Rankin; Meyertons, Hood, Kivlin, Kowert & Goetzel, P.C.

(57) ABSTRACT

A computer system and method for performing restore operations. A computer system includes one or more hosts. At least one host includes a backup agent. In response to a request to restore a file to a first host, a backup component identifies copies of portions of the file stored on a second host, retrieves the copies, and restores the file on the first host from the copies. The backup component maintains a catalog of entries corresponding to copies of portions of files stored on the hosts. In response to a request to restore the file to a first host, the backup component queries the catalog to identify one or more candidate locations where copies of portions of the file have been stored. The first and second hosts may be the same. The backup component may be located on a host or on a backup server.

20 Claims, 13 Drawing Sheets

FIG. 12

LEVERAGING CLIENT REDUNDANCY ON RESTORE

BACKGROUND OF THE INVENTION

1. Field of the Invention

This invention relates to computer systems and, more particularly, to backup file restoration within computer systems.

2. Description of the Related Art

It is common practice for individuals and enterprises to protect data that resides on a variety of computer hosts via some type of backup mechanism. For example, numerous client devices may be coupled to a network to which a backup server is also coupled. The backup server may be further coupled to one or more tape drives or other backup media. A backup agent on each host may convey data files to the backup server for storage on backup media according to a variety of schedules, policies, etc. To facilitate restoring backup files, the backup server may maintain a catalog of the files that have been stored on the backup media. When a client wishes to restore a file, the server may present a view of the catalog or a portion of the catalog from which the client may make a selection. Once the client has indicated which file is to be restored, the backup server may initiate a restoration process.

In large systems, each client may include a backup agent and responsibility for backup and restore operations may be distributed among one or more backup servers and the backup agents. Instead of or in addition to the backup catalogs kept by the backup servers, each agent may include a local backup catalog of its own, storing data specific to its associated client. During a restore operation, a backup agent may first query the local backup catalog, thereby avoiding the delay that may be associated with querying the backup server's catalog.

Unfortunately, even when local backup catalogs are used, the restoration process may be slow and inefficient. For example, because many clients typically share a small number of backup servers, the restoration process may be slowed by network latencies. Restoration may be further slowed if a slow or busy WAN link connects the backup server to its clients. Also, for tape-based backup, once a file has been identified for restoration, administrator assistance may be required to mount the particular tape that contains the desired file, increasing expense and turnaround time. In addition, files that have not been backed up are not available for restoration. In view of the above, an effective system and method for restoration of files that accounts for these issues is desired.

SUMMARY OF THE INVENTION

Various embodiments of a computer system are disclosed. In one embodiment, the computer system includes one or more hosts. At least one of the hosts includes a backup agent. In response to a request to restore a file to a first host, a backup component is configured to identify a copy of at least a portion of the file stored on a second host, retrieve the copy, and restore the file on the first host using the copy. In a further embodiment, the backup component is configured to maintain a catalog of entries corresponding to copies of portions of files stored on the one or more hosts. In response to a request to restore the file to a first host, the backup component is further configured to query the catalog to identify one or more candidate locations where copies of portions of the file have been stored.

In a still further embodiment, the computer system includes and at least one backup server configured to store copies of files on a backup medium. The backup component comprises the at least one backup server and/or a backup agent located on the first host. In another embodiment, the backup component comprises a backup agent located on the second host. In yet another embodiment, the first and second hosts are the same host.

In another embodiment, the backup component is further configured to detect a file attached to an e-mail message and create an entry in the catalog corresponding to the file attached to the e-mail message. The resulting entry includes data identifying a source and/or one or more destination locations associated with the e-mail message. In yet another embodiment, the catalog comprises entries corresponding to copies of files stored during creation of a restore point on the host on which the backup component is located and/or copies of files stored on a host separate from the host on which the backup component is located during a file transfer from the host on which the backup component is located.

These and other embodiments will become apparent upon consideration of the following description and accompanying drawings.

BRIEF DESCRIPTION OF THE DRAWINGS

FIG. 12 illustrates an alternative embodiment of a catalog that may be used in backup and restore operations.

Figure 1:
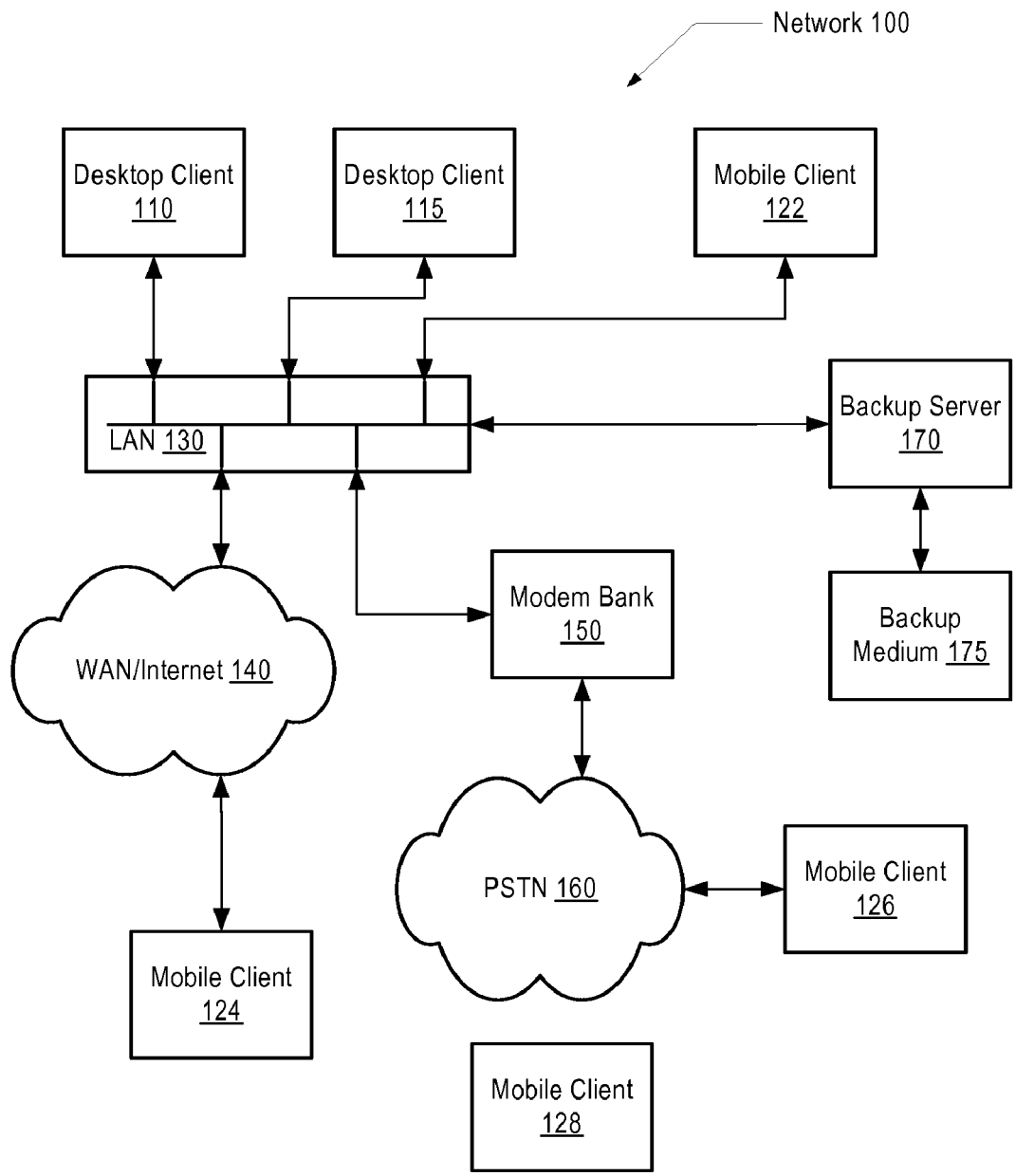
FIG. 1 illustrates one embodiment of a network.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates one embodiment of a network 100. Network 100 includes desktop clients 110 and 115 that are representative of any number of stationary client computers. Network 100 may also include mobile clients 122, 124, 126, and 128 that are representative of any number of mobile client computing devices such as laptops, handheld computers, etc. In one embodiment, network 100 includes a local area network (LAN) 130 to which are connected a modem bank 150 and a backup server 170. LAN 130 may also be connected to a wide area network (WAN)/Internet 140 and or to the public switched telephone network (PSTN) 160 via modem bank 150. In the illustrated embodiment, mobile client 122 is directly connected to LAN 130, mobile client 124 is connected to LAN 130 via WAN 140, mobile client 126 is connected to LAN 130 via PSTN 160 and modem bank 150, and mobile client 128 is not connected to LAN 130, i.e., it is offline.

In alternative embodiments, the number and type of clients is not limited to desktop clients 110 and 115 and mobile clients 122, 124, 126, and 128. Almost any number and combination of desktop and mobile clients may be connected to network 100 via various combinations of modem banks, direct LAN connections, wireless connections, WAN links, etc. Also, at various times one or more clients may operate offline. In addition, during operation, individual client connection types may change as mobile users travel from place to place connecting, disconnecting, and reconnecting to enterprise network 100.

Within enterprise network 100, it may be desired to protect data associated with any of clients 122, 124, 126, and 128. In order to protect client data, various backup operations are possible. For example, in one embodiment, backup server 170 may include one or more backup media on which a copy of data from clients 122, 124, 126, and 128 may be stored. In addition, clients 122, 124, 126, and 128 may be equipped with plural media so that data may be backed up locally and/or on a backup server over network 100. In operation, data protection software located on each of clients 122, 124, 126, and 128 may execute in the background to perform data backups. Backup frequency and storage location may depend on a variety of factors including the urgency of data protection, availability of media storage space, network connection state, and enterprise policies. For example, in one embodiment, a mobile client such as client 128 may take advantage of local backups when it is not connected to enterprise network 100. Subsequently, if mobile client 128 connects to network 100, a backup of data to data server 170 may be performed.

Figure 2:
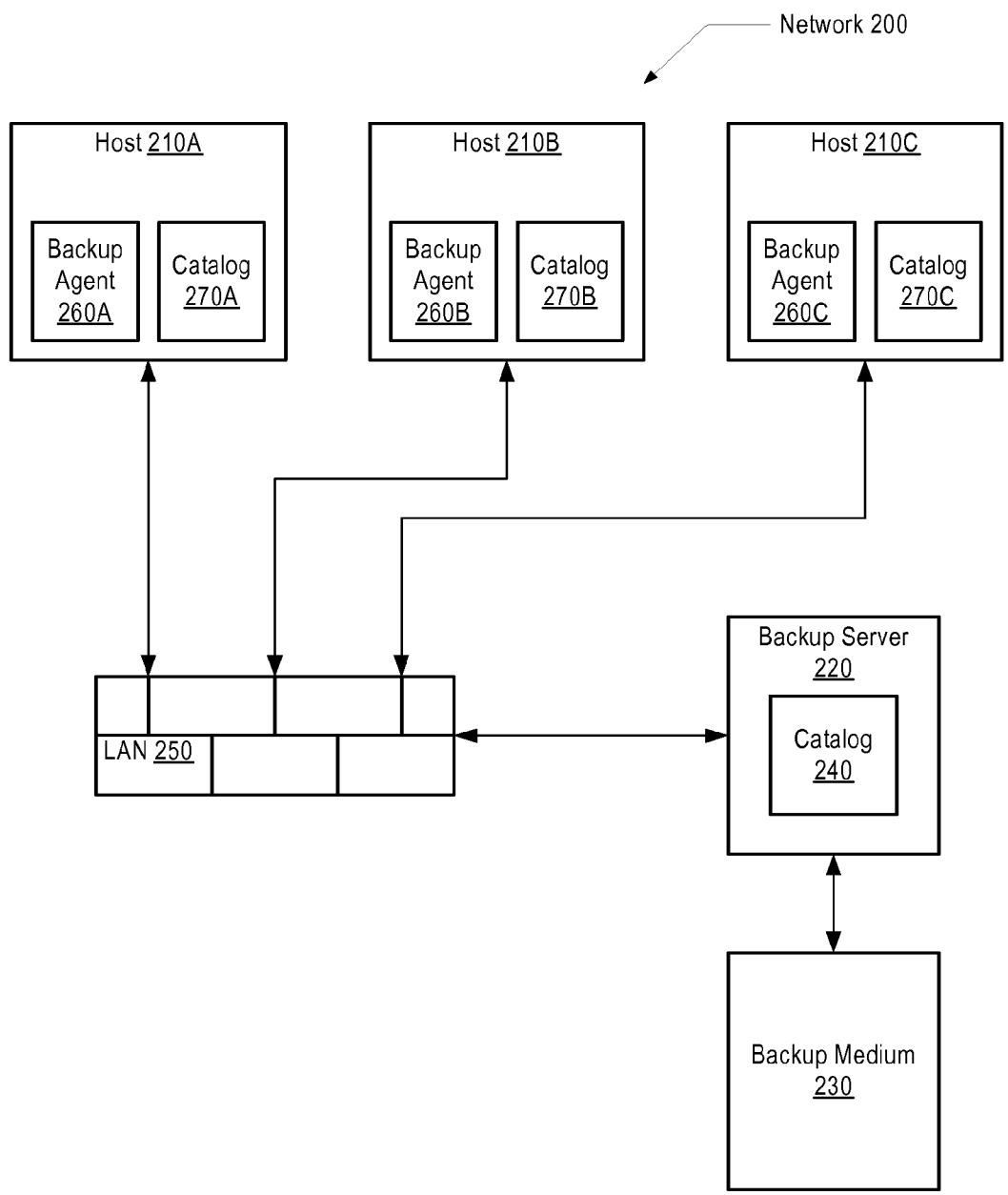
FIG. 2 illustrates one embodiment of a portion of a network.

FIG. 2 illustrates one embodiment of a network 200 that may be a portion of network 100. Network 200 includes hosts 210A-210C that are representative of any number of desktop or mobile client devices such as those illustrated in FIG. 1. Elements referred to herein by a reference numeral followed by a letter may be collectively referred to by the reference numeral alone. For example, hosts 210A-210C may be referred to as hosts 210. In one embodiment, network 200 includes a LAN 250 to which hosts 210 and a backup server 220 may be interconnected. Backup server 220 may also be coupled to a backup medium 230. Each of hosts 210 may include a backup agent 260 and a catalog 270. Backup server 220 may also include a backup catalog 240. In one embodiment, backup catalog 240 may be a global catalog that includes a combination of the entries stored in catalogs 270. Backup server 220 may share certain capabilities with backup agents 260. For convenience, when describing such capabilities, any of backup agents 260 or backup server 220 may be referred to as a backup component.

During operation, hosts 210 may backup data files to backup medium 230 via a backup application implemented through backup server 220 and backup agents 260. More specifically, a host 210 may utilize its associated backup agent 260 to communicate with backup server 220 via LAN 250. In prior art systems, backup agent 260 may send files that are to be backed up to backup medium 230 via backup server 220 and retrieve files that are to be restored from backup medium 230 via backup server 220. Backup components may consult a local catalog 270 or catalog 240 at backup server 220 to determine which files are available to be restored. However, in the present invention, catalogs 270 and/or 240 may include entries for files that are stored somewhere on a device connected to LAN 250 in addition to entries for files that have been backed up on backup medium 230, such as would be found in prior art catalogs. The details of a system and methods for restoring files that are stored locally, whether or not these same files have been stored on backup medium 230, are given below.

Figure 3:
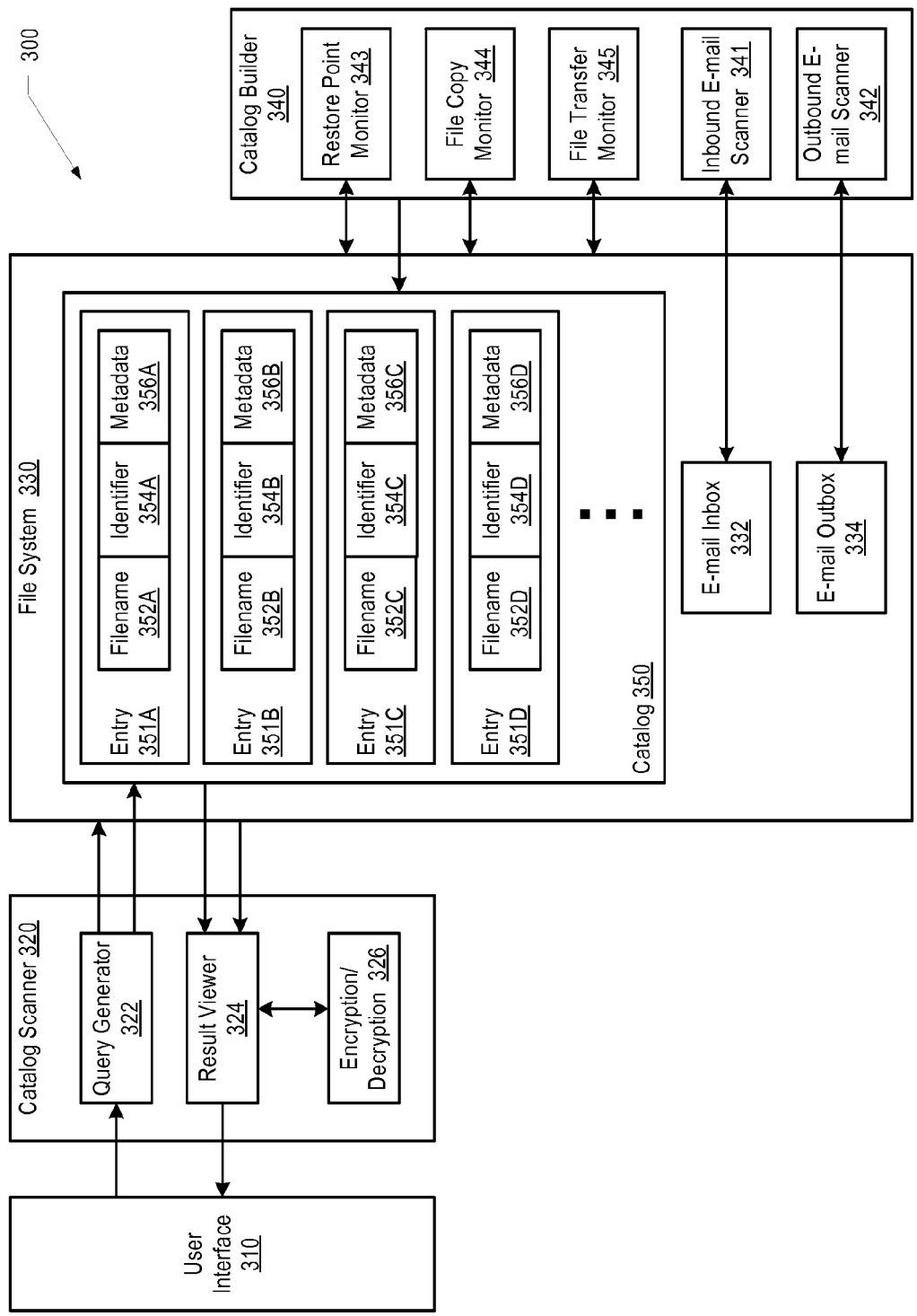
FIG. 3 is a generalized block diagram of one embodiment of a system that may be used in backup and restore operations.

FIG. 3 is a generalized block diagram of one embodiment of a system 300 that may be used in backup and restore operations. In the illustrated embodiment, system 300 includes a user interface 310, a catalog scanner 320, a file system 330, and a catalog builder 340. Catalog scanner 320 and catalog builder 340 may be included in a backup component as described above. Catalog scanner 320 may include a query generator 322, a result viewer 324, and an encryption/decryption module 326. File system 330 may include a catalog 350, an e-mail inbox 332, and an e-mail outbox 334. Catalog 350 may include a series of entries 351, of which entries 351A-351D are shown.

Each entry 351 may include data associated with a file that can be identified for restoration. For example, in the illustrated embodiment, each entry 351 includes a filename 352, an identifier 354, and metadata 356. Since it is not likely that matching filenames alone can unambiguously determine that two files match, additional data may be added to each entry such as identifiers 354 and metadata 356. An identifier 354 may include a checksum, cryptographic hash, or other signature data that is more likely to determine that two files match unambiguously. Examples of metadata include file type, version number, file size, file location, file ownership and permissions, and file modification time. Other forms of metadata and/or identifiers will be apparent to those of ordinary skill in the art.

Catalog builder 340 may include an inbound e-mail scanner 341, an outbound e-mail scanner 342, a restore point monitor 343, a file copy monitor 344, and a file transfer monitor 345. During operation, the components of catalog builder 340 may monitor portions of file system 330 in order to detect events that trigger the creation of a new catalog entry. For example, in one embodiment, in addition to monitoring prior art backup operations that result in the creation of new catalog entries (not shown), restore point monitor 343 may monitor file system 330 to detect the creation of a restore point. Generally speaking, when a restore point is created, a copy of each file that is present on the local host may be saved. Restore point monitor 343 may create an entry 351 including identifying information and metadata that permit a copy of the corresponding file to be retrieved to fulfill a request to restore such a file without needing to retrieve a copy from a remote backup medium. Similarly, in a further embodiment, file copy monitor 344 may monitor file system 330 to detect the creation of new files or copies of files. File copy monitor 344 may create an entry 351 for each new file or copy that is detected. In still further embodiments, file transfer monitor 345 may monitor file system 330 to detect a transfer of a file from file system 330 to another file system on the same host or on a different host, creating a corresponding entry 351 for each transferred file. An entry 351 that corresponds to a transferred file may, in one embodiment, contain metadata identifying the location to which the file was transferred. It is noted that when a file is deleted, the corresponding entry 351 may be retained so as to be available for matching comparison of its metadata if a request to restore the deleted file is made. Accordingly, each entry 351 includes information that identifies a candidate location that at some point in time held a copy of the corresponding file.

In the embodiment illustrated in FIG. 3, catalog builder 340 also includes inbound e-mail scanner 341 and outbound e-mail scanner 342. During operation, inbound e-mail scanner 341 may monitor e-mail inbox 332. If e-mail scanner 341 detects that an inbound e-mail message includes an attached file, an entry 351 corresponding to the attached file may be created. In the case of inbound attached files, the corresponding entry 351 may contain metadata identifying the file that, in one embodiment, may be used to restore that file from a host other than the one receiving the e-mail. The metadata associated with an inbound e-mail message attached file may include information identifying the source of the message and/or one or more additional destinations to which the e-mail was directed. In addition, outbound e-mail scanner 342 may monitor e-mail outbox 334. If e-mail scanner 342 detects that an outbound e-mail message includes an attached file, an entry 351 corresponding to the attached file may be created. In the case of outbound attached files, the corresponding entry 351 may contain metadata identifying one or more locations to which the file was transferred. In one embodiment, such metadata may be used to restore the file to the host that sent the e-mail. In alternative embodiments, catalog builder 340 may contain any of a variety of components for detecting that a copy of a file has been made and stored somewhere on the local host or on another host on the network and triggering the creation of a corresponding catalog entry 351. Various such alternative embodiments of catalog builder 340 will be apparent to one of ordinary skill in the art, given the above description.

Returning to the operation of catalog scanner 320, a user desiring to restore a file may send a request to query generator 322 via user interface 310. Such a request may include user selected matching criteria that may be used by query generator 322 to find one or more matching files. Query generator 322 may generate a query including the user selected matching criteria and convey the query to catalog 350. Catalog 350 may respond by conveying information including filenames, identifiers, and metadata describing matching entries 351 to result viewer 324. If cryptographic identifiers are included in the returned information, result viewer 324 may use encryption/decryption module 326 to further refine the matches. For example, result viewer 324 may identify a catalog entry matching the user selected matching criteria, including one or more cryptographic identifiers, and corresponding to a file that has been deleted but to which the user had authorized access. In one embodiment, result viewer 324 may be configured to filter out additional files or file copies that match one or more of the user selected matching criteria such as filename and size, but fail to match the cryptographic identifiers of the deleted file. In an alternative embodiment, query generator 322 may be configured to generate a modified query that includes the cryptographic identifiers. In this embodiment, only pre-filtered file information is returned to result viewer 324 in response to the modified query.

In a further embodiment, in addition to examining a local catalog 350, query generator 322 may perform a search operation on the local file system including e-mail inbox 332 and e-mail outbox 334, searching for stored files or attachments that match the matching criteria. In still further embodiments, query generator 322 may examine entries 351 found in other catalogs 350 (not shown) found on remote hosts and/or on a backup server. In still further embodiments, query generator 322 may perform searches on the file system of one or more remote hosts, depending on a variety of factors such as the size, bandwidth, connectivity, and authorization policies and safeguards of the network to which the hosts are coupled. Any matching results from the local file system and/or remote hosts may be handled in the same way as results found in local catalog 350, as described above.

Once result viewer 324 has obtained a list of files that are restorable, optionally filtered by matching cryptographic identifiers, the list may be presented to the user through user interface 310 as is conventionally done with backup and restore applications. The user may then select a particular file for restoration via user interface 310. A backup component may then restore the particular file from its identified location without needing to retrieve the file from a backup medium such as backup medium 230 of FIG. 2. However, if result viewer 324 does not receive sufficient matching file information, a backup component may proceed to restore the desired file via a conventional restoration process from a backup medium such as backup medium 230 of FIG. 2.

Figure 4:
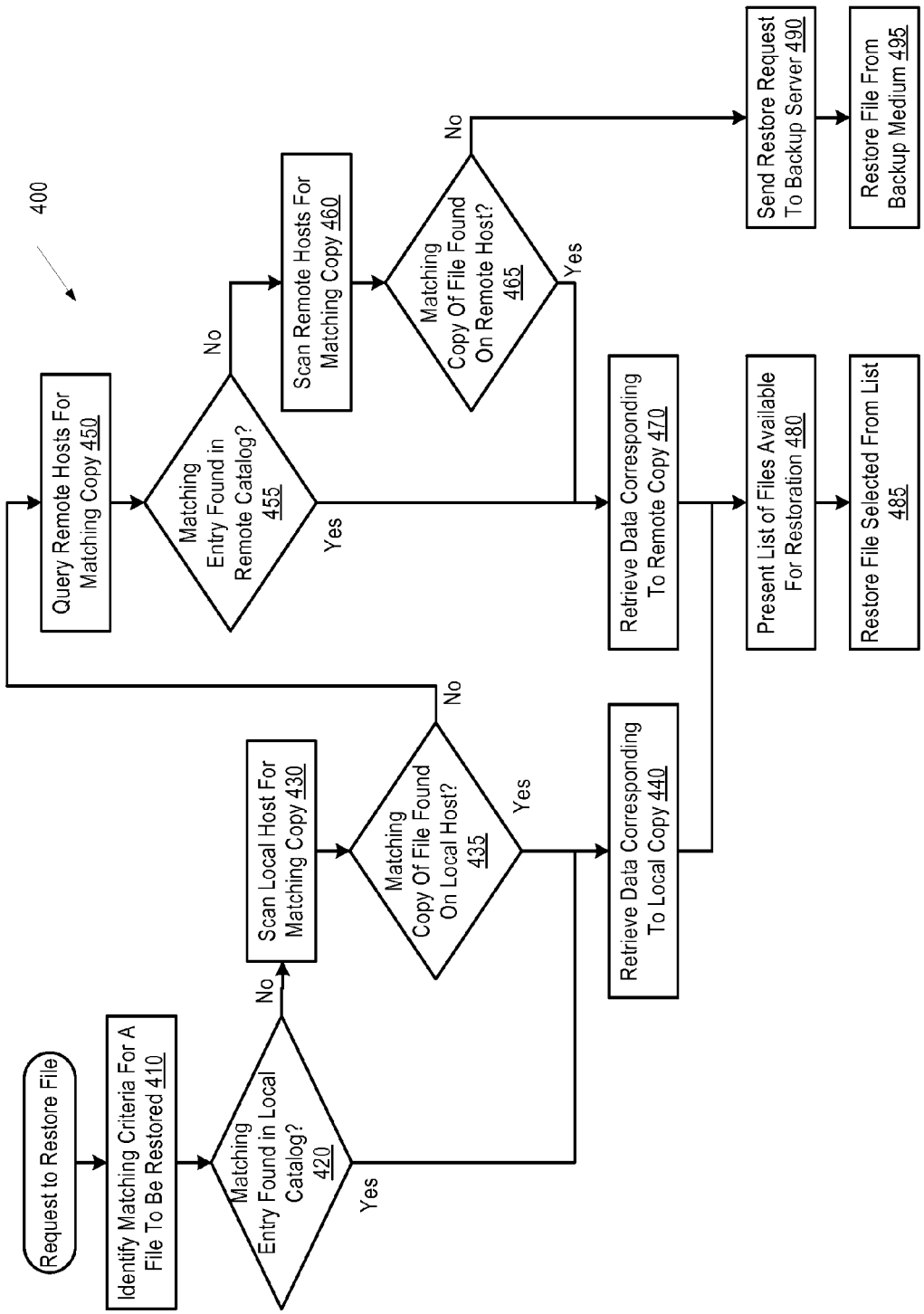
FIG. 4 illustrates one embodiment of a process for restoring a file.

FIG. 4 illustrates one embodiment of a process 400 for restoring a file. When a request to restore a file is made by a user, process 400 may begin with the identification of the file's matching criteria (block 410). Once the matching criteria are collected, a local catalog may be queried and if a matching entry is found (decision block 420), data from the catalog may be retrieved (block 440). If a matching entry is not found in the local catalog (decision block 420), the local host may be scanned in search of a matching copy of the desired file (block 430). If a matching local copy is found (decision block 435), data from the matching local copy may be retrieved (block 440). If a matching local copy is not found (decision block 435), a query may be sent to one or more remote hosts in search of a matching copy of the desired file (block 450). If a matching entry is found in a remote catalog (decision block 455), data from the remote catalog may be retrieved (block 470). If a matching entry is not found in a remote catalogs (decision block 455), the remote hosts may be scanned in search of a matching copy of the desired file (block 430). If a matching remote copy is found (decision block 465), data from the matching local copy may be retrieved (block 470). If no matching remote or local copies are found, restore request may be sent to a backup server (block 490) and a conventional restoration process executed (block 495). Once data from matching local and/or remote copies has been retrieved, a list of the corresponding files that are available for restoration may be presented to the user (block 480). The user may then select a file to be restored and the restoration may proceed using the identified file copy (block 485).

Figure 5:
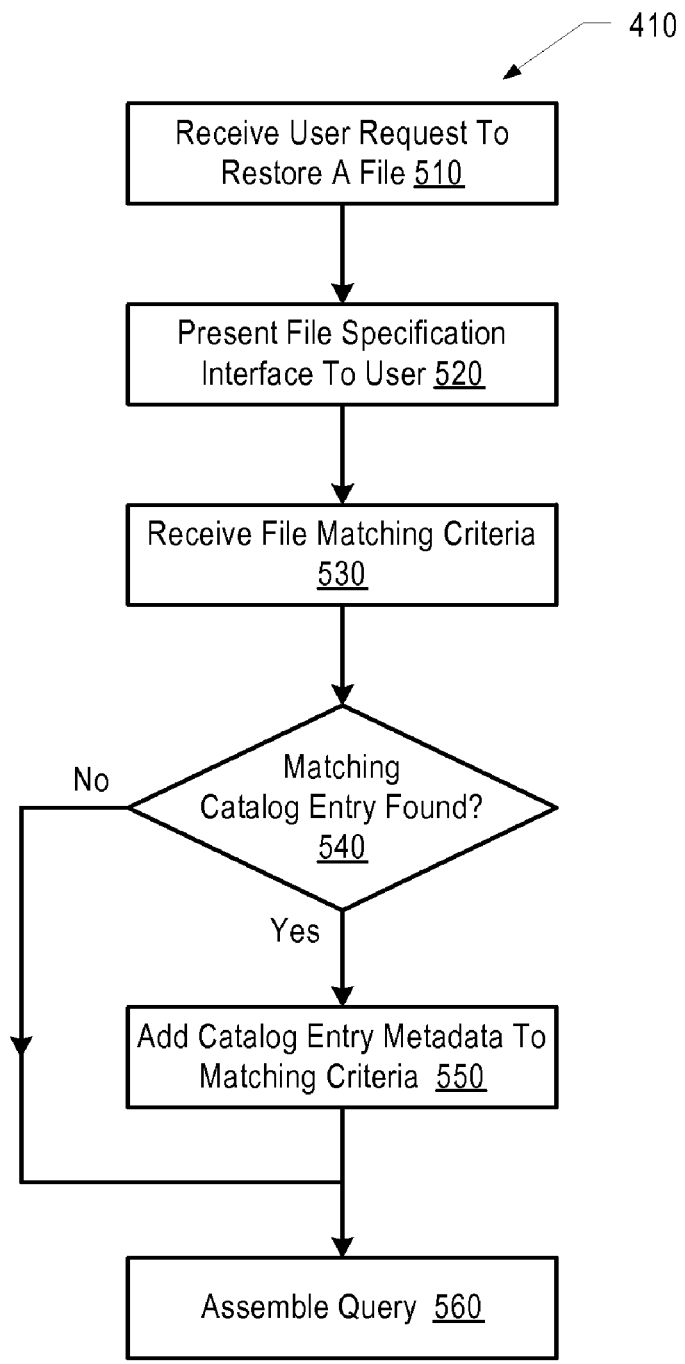
FIG. 5 illustrates a more detailed description of one embodiment of a process for identifying matching criteria for a file to be restored.

FIG. 5 illustrates a more detailed description of one embodiment of a process 410 for identifying matching criteria for a file to be restored. When a file is to be restored, process 410 may begin with the reception of a user request (block 510). In response to the user request, the user may be presented with a user interface window through which to specify or select matching criteria (block 520). The user's selections and specifications may be received (block 530). A query of a backup catalog may be performed (decision block 540). If a matching entry is found, metadata from the entry may be added to the matching criteria (block 550). For example, a cryptographic hash may be included in the metadata of the matching entry that may be used to narrow the matching criteria. Once the metadata is added to the matching criteria, or if there are no matching entries in the local catalog, a query may be assembled (block 560) for use in querying the local file system or remote catalogs and file systems.

Figure 6:
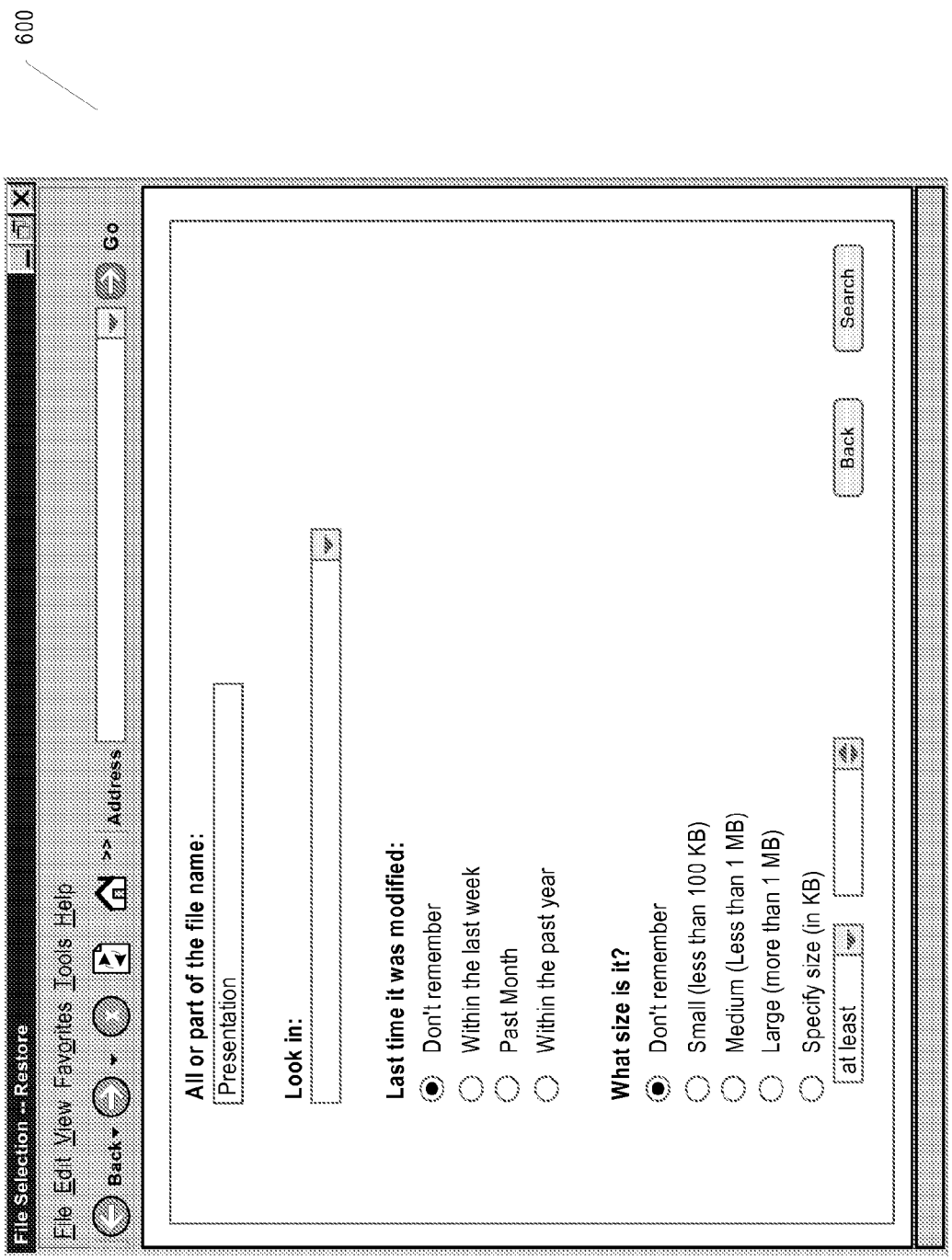
FIG. 6 illustrates one embodiment of a matching criteria selection user interface that may be used with a backup/restore application.

FIG. 6 illustrates one embodiment of a matching criteria selection user interface 600 that may be used with a backup/restore application. In the illustrated embodiment, user interface 600 is a web browser application that allows the user to connect to a backup agent and specify one or more matching criteria from which the backup component may query local and remote catalogs and file systems. User interface 600 may include the standard features of a web browser window such as drop-down menus, a navigation bar, and an address field. The user may enter a URL into the address field that corresponds to a backup component. At the top of the web browser interface is a field labeled "All or part of the file name:" into which the user may type all or part of the file name of a file to be restored. In the illustration of FIG. 6, a file name of "Presentation" has been entered. A second field below the first is labeled "Look in:" and allows the user to type a directory or path in which to look for a file to be restored. The second field may be a pull-down list from which the user may select recently used directories or paths. Below the second field is a series of radio buttons under the label "Last time it was modified:" that permit the user to select various time periods when the file to be restored was last modified. In the illustration of FIG. 6, the user has selected a button labeled "Don't remember." Below these radio buttons is another series of radio buttons under the label "What size is it?" that permit the user to select one of a variety of size ranges into which the file to be restored falls. In the illustration of FIG. 6, the user has again selected a button labeled "Don't remember." At the bottom of the last field of radio buttons are input fields through which the user may enter a size in kilobytes (KB) for the file to be restored. Once the selections and entries have been entered into interface 600, the user may click on a search button to send the matching criteria to the backup agent. User interface 600 is representative of a variety of input tools that may be constructed using conventional graphical user interface elements. A variety of alternatives to user interface 600 will be apparent to one of ordinary skill in the art.

Figure 7:
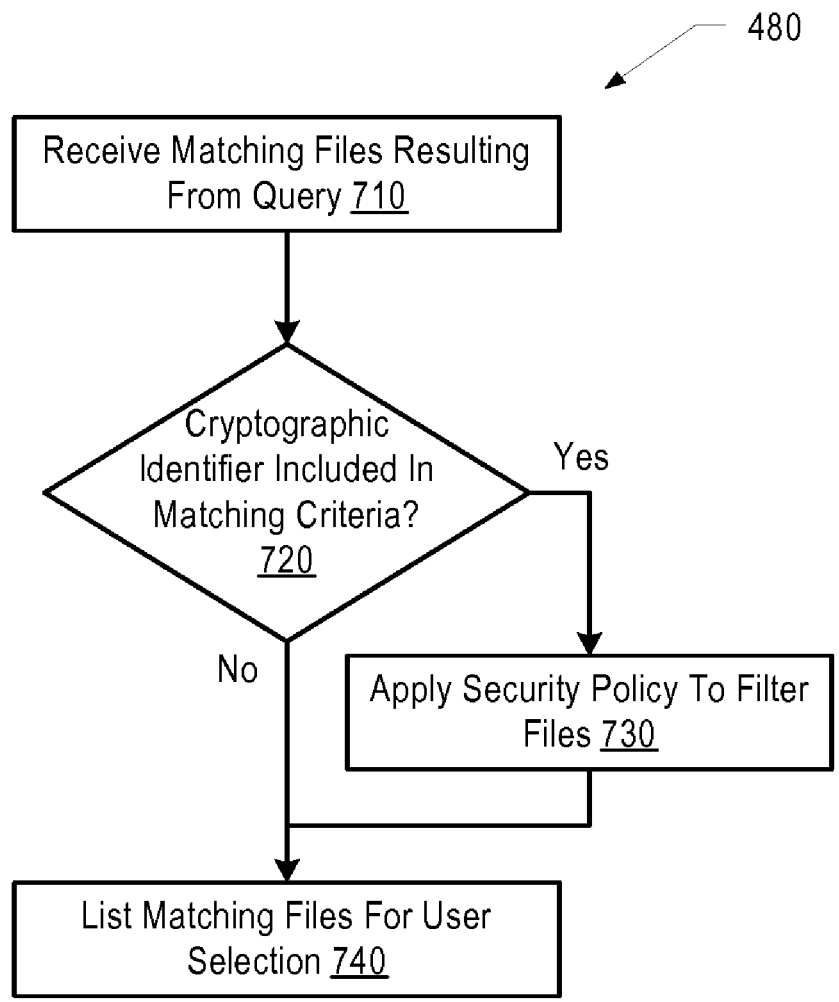
FIG. 7 illustrates a more detailed description of one embodiment of a process for presenting a list of files that are available to be restored.

FIG. 7 illustrates a more detailed description of one embodiment of a process 480 for presenting a list of files that are available to be restored. When a list of files that are available to be restored is to be presented, process 480 may begin with the reception of information corresponding to files that match user selected matching criteria (block 710). Before presenting the received information to the user, it may be determined if the information includes cryptographic identifiers (block 720). If cryptographic identifiers are included, a security policy may be applied to filter matching files (block 730) either by modifying the query or by removing results of the original query that do not match the cryptographic identifiers. If no cryptographic identifiers are included or after filtering the matching files, the resulting matching files may be presented to the user for selection of a particular file to restore (block 740).

Figure 8:
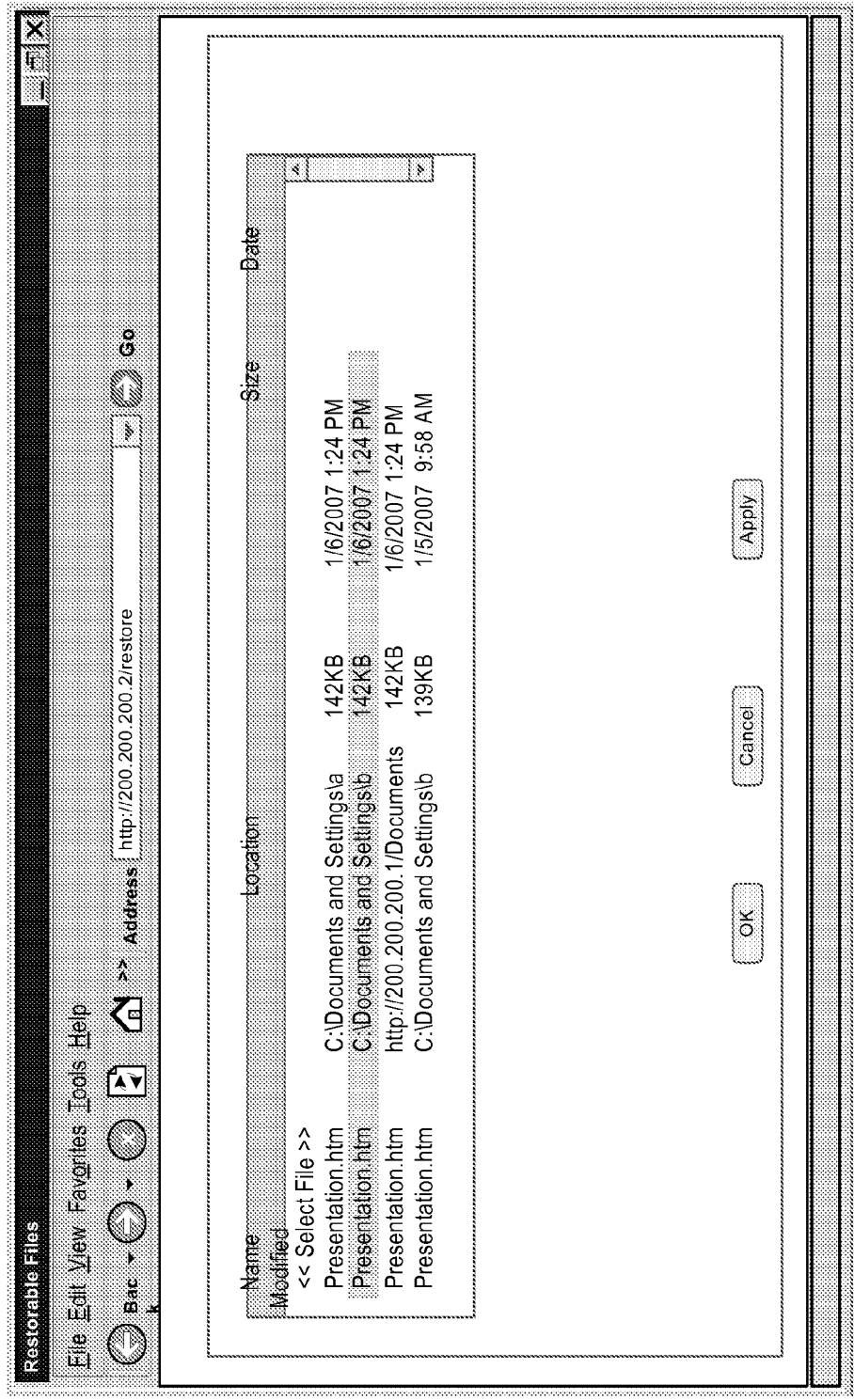
FIG. 8 illustrates one embodiment of a file selection user interface that may be used with a backup/restore application.

FIG. 8 illustrates one embodiment of a file selection user interface 800 that may be used with a backup/restore application. In the illustrated embodiment, user interface 800 is a web browser application that allows the user to connect to a backup component and specify which of a list of files is to be restored. User interface 800 may include the standard features of a web browser window such as drop-down menus, a navigation bar, and an address field. The user may enter a URL into the address field that corresponds to a backup component. In the middle of the web browser interface, is a scrollable list of files from which the user may select a file to be restored. Each item in the list includes a number of fields. In the illustrated embodiment, the fields are name, location, size, and date modified. A variety of other fields corresponding to other matching criteria may be included in addition or instead of those shown in FIG. 8. In the illustration of FIG. 8, a file name of "Presentation.htm" has been selected, as indicated by highlighting. The selected file is located in "C:\Documents and Settings\b", is 142 KB in size, and was last modified on Jan. 6, 2007 at 1:24 PM. Note that other entries for identically named files or copies are presented, but each either has a different location, size, or last modified date and time. Below the scrollable list of files are conventional buttons labeled "OK", "Cancel", and "Apply". By clicking the "OK" or "Apply" buttons, the user may cause the selected file to be restored.

Figure 9:
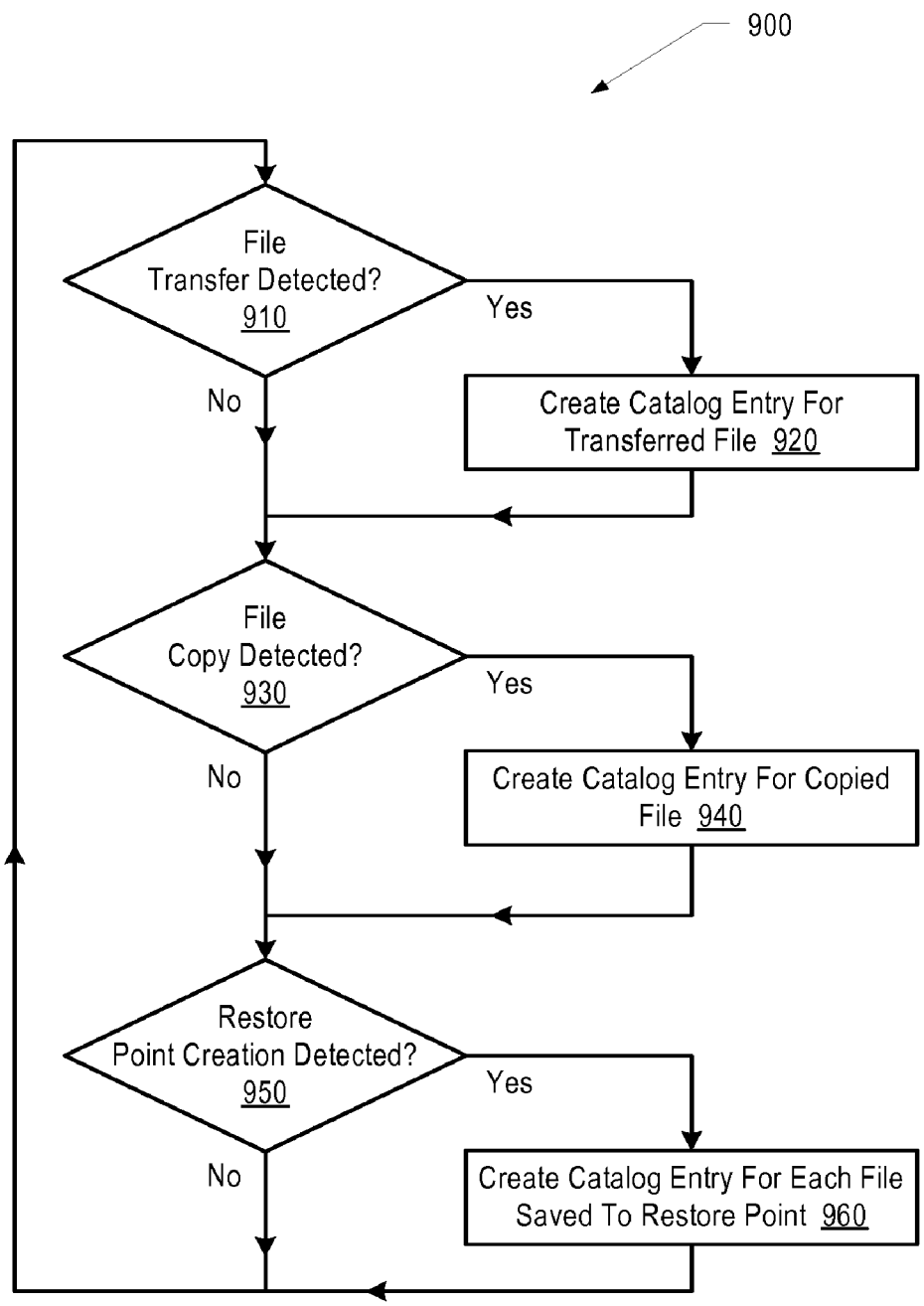
FIG. 9 illustrates one embodiment of a process for monitoring a file system that may be used to create entries in a backup catalog.

FIG. 9 illustrates one embodiment of a process 900 for monitoring a file system that may be used to create entries in a backup catalog. In the illustrated embodiment, process 900 begins by checking to see if any files have been transferred from the local file system to another host (decision block 910). If a file transfer is detected, a catalog entry may be created for the transferred file (block 920). The catalog entry may include the destination address to which the file is being transferred. If a file transfer is not detected, or after a catalog entry is created, process 900 continues by checking to see if any files have been copied within the local file system (decision block 930). If a file copy is detected, a catalog entry may be created for the copied file (block 940). If a file copy is not detected, or after a catalog entry is created, process 900 continues by checking to see if a restore point has been created within the local file system (decision block 950). If creation of a restore point is detected, a catalog entry may be created for each file included in the restore point (block 960). If creation of a restore point is not detected, or after a catalog entry is created for each file included in the restore point, process 900 may return to block 910. In the illustrated embodiment, decision blocks 910, 930, and 950 are executed in series in a continuous loop. In alternative embodiments, decision blocks 910, 930, and 950 may be executed in parallel or in a series-parallel combination.

Figure 10:
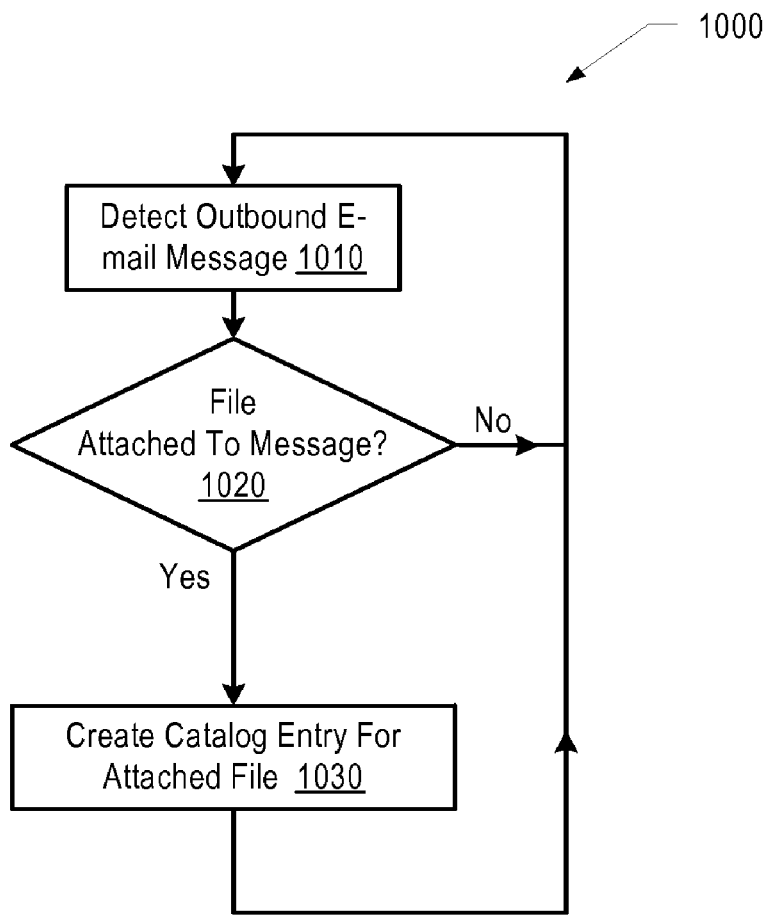
FIG. 10 illustrates one embodiment of a process for monitoring outbound e-mail messages that may be used to create entries in a backup catalog.

FIG. 10 illustrates one embodiment of a process 1000 for monitoring outbound e-mail messages that may be used to create entries in a backup catalog. In the illustrated embodiment, process 1000 begins by detecting an outbound e-mail message (block 1010). Next, the detected message is checked to see if it contains an attached file (decision block 1020). If an attached file is detected, a catalog entry may be created for the attached file (block 1030). The catalog entry may include one or more destination addresses to which the message is being sent. If an attached file is not detected, or after a catalog entry is created, process 1000 may returns to block 1010 to wait for another outbound e-mail message.

Figure 11:
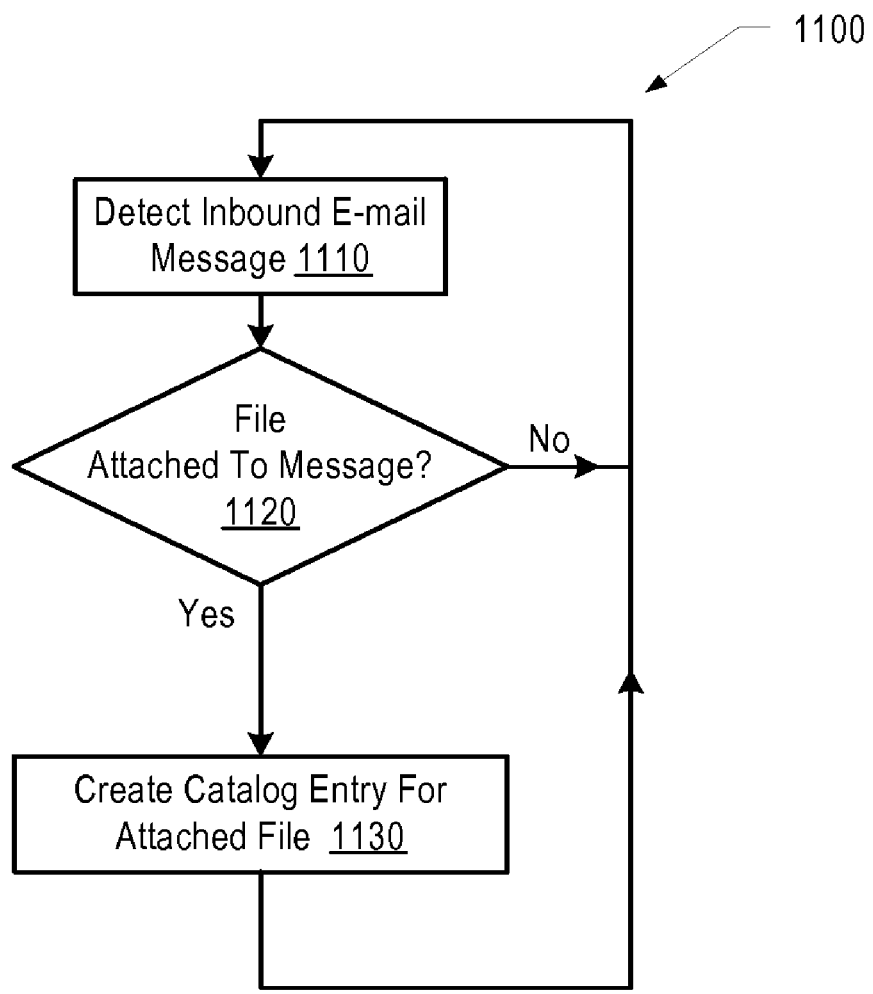
FIG. 11 illustrates one embodiment of a process for monitoring inbound e-mail messages that may be used to create entries in a backup catalog.

FIG. 11 illustrates one embodiment of a process 1100 for monitoring inbound e-mail messages that may be used to create entries in a backup catalog. In the illustrated embodiment, process 1100 begins by detecting an inbound e-mail message (block 1110). Next, the detected message is checked to see if it contains an attached file (decision block 1120). If an attached file is detected, a catalog entry may be created for the attached file (block 1130). The catalog entry may include the source of the e-mail message and/or one or more additional destination addresses to which the message is being sent. If an attached file is not detected, or after a catalog entry is created, process 1100 may returns to block 1110 to wait for another inbound e-mail message.

In alternative embodiments of the present invention, copies of files may be split into blocks, with different blocks stored in different locations. For instance, copies of two large files that differ by a small amount may be efficiently stored as a first file containing the overlapping data and additional files containing the non-overlapping data. In some embodiments, blocks associated with a given file may be dispersed for storage on more than one host. Other applications in which file copies may be divided into separately stored blocks will be apparent to one of ordinary skill in the art.

Figure 12:
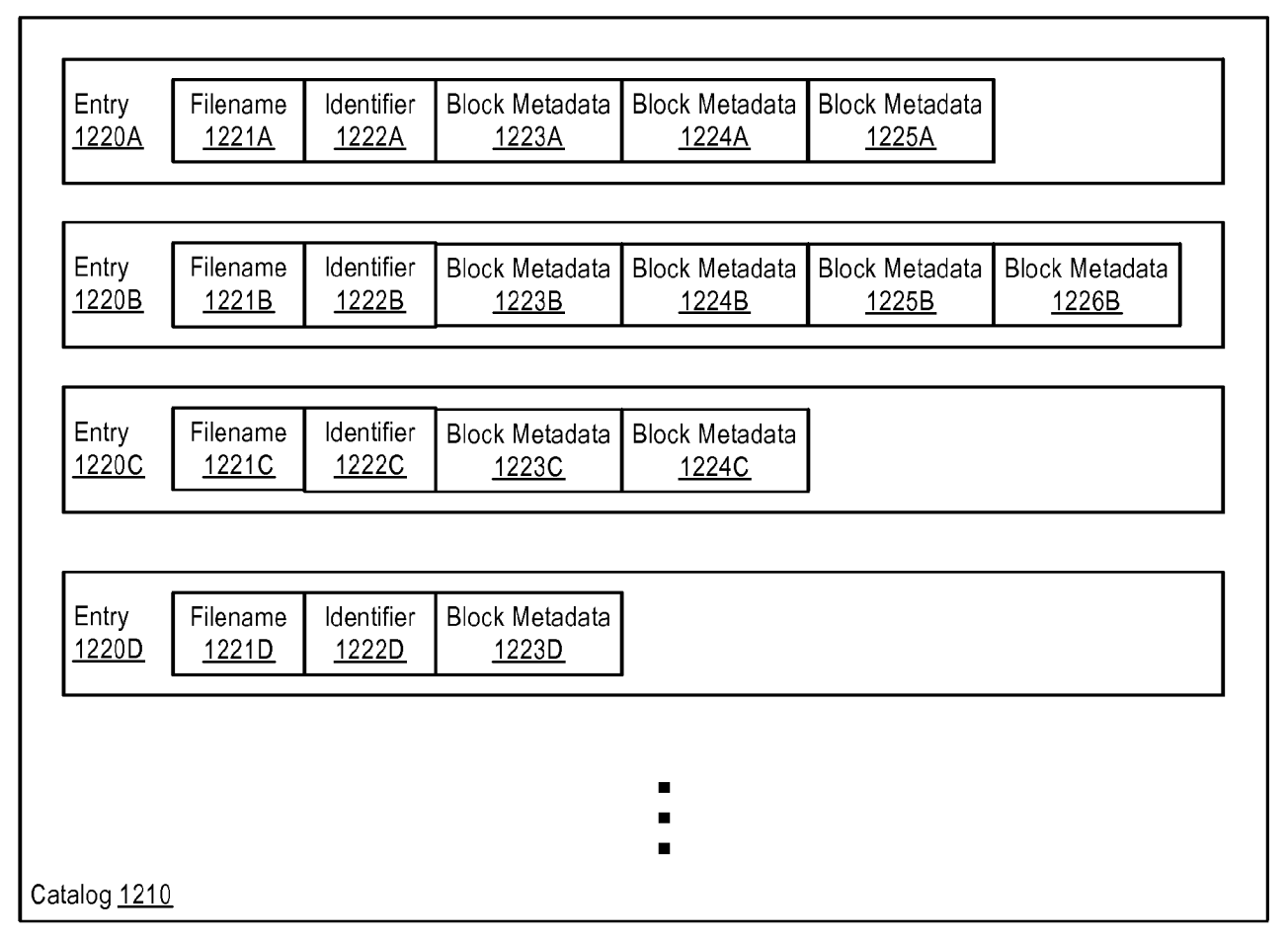

FIG. 12 illustrates an alternative embodiment of a catalog 1210 that may be used in backup and restore operations when files are stored in blocks. In the illustrated embodiment, catalog 1210 include a series of entries 1220, of which entries 1220A-1220D are shown. In contrast to entries 351, previously described, each entry 1220 may include data associated with a file or a portion of a file, i.e., a block or a set of blocks, which can be identified for restoration. For example, in the illustrated embodiment, each entry 1220 includes a filename 1221, an identifier 1222, and one or more block metadata sub-entries 1223, 1224, 1225, etc. More specifically, entry 1220A includes sub-entries 1223A, 1224A, and 1225A each of which is related to a portion of the file identified by filename 1221A and identifier 1222A. Each sub-entry may include metadata such as a file identifier, version number, block size, block location, block modification time, block checksum, cryptographic hash, or other signature data corresponding to a block. Other forms of metadata and/or identifiers will be apparent to those of ordinary skill in the art.

Inbound e-mail scanner 341, outbound e-mail scanner 342, restore point monitor 343, file copy monitor 344, and file transfer monitor 345 may create entries 1220 including identifying information and metadata corresponding to files and/or blocks. An entry 1220 that corresponds to a transferred block or set of blocks may, in one embodiment, contain metadata identifying the location to which the block or set of blocks was transferred. It is noted that when a file or block is deleted, the corresponding entry 1220 may be retained so as to be available for matching comparison of its metadata if a request to restore a file including the deleted block is made. Accordingly, each entry 1220 includes information that identifies a candidate location that at some point in time held a copy of the corresponding file, block, or set of blocks.

Figure 13:
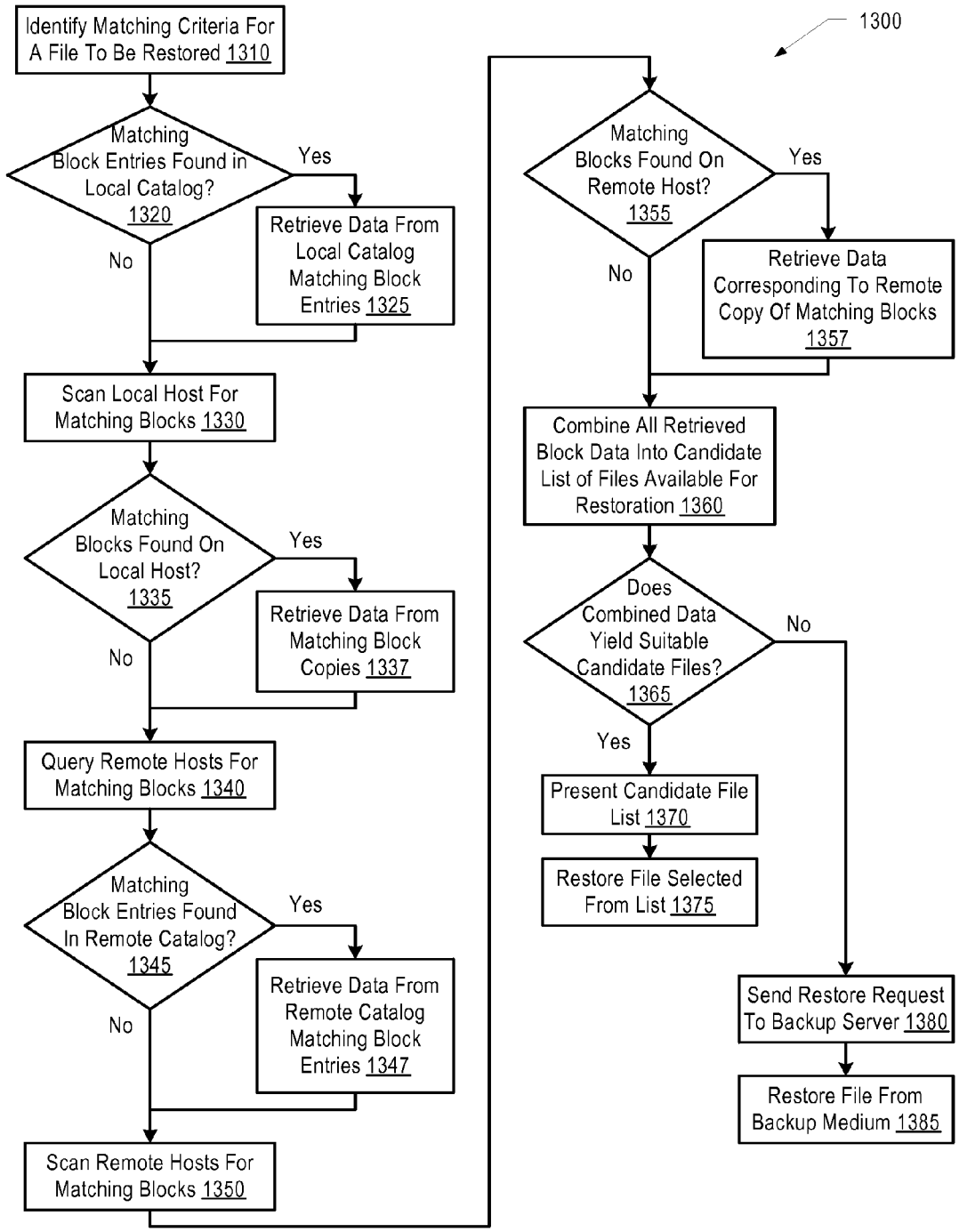
FIG. 13 illustrates an alternative embodiment of a process for restoring a file.

FIG. 13 illustrates an alternative embodiment of a process 1300 for restoring a file. When a request to restore a file is made by a user, process 1300 may begin with the identification of the file's matching criteria (block 1310). Once the matching criteria are collected, a local catalog may be queried in search of entries corresponding to blocks matching the desired file. If a matching block entry is found (decision block 1320), data from the catalog may be retrieved (block 1325). If no matching block entries are found in the local catalog or after retrieving data from the matching block entries, the local host may be scanned in search of matching blocks (block 1330). If local copies of one or more matching blocks are found (decision block 1335), data from the local copies may be retrieved (block 1337). If no matching local copies are found, or after retrieving data from the local copies, a query may be sent to one or more remote hosts in search of blocks matching the desired file (block 1340). If a matching block entry is found in a remote catalog (decision block 1345), data from the remote catalog may be retrieved (block 1347). If no matching block entries are found in remote catalogs, or after retrieving data from the matching block entries, the remote hosts may be scanned in search of matching blocks (block 1350). If remote copies of one or more matching blocks are found (decision block 1355), data from the remote copies may be retrieved (block 1357). If no matching remote copies are found, or after retrieving data from the remote copies, all of the retrieved matching block data may be combined into a candidate list of files that are available for restoration (block 1360). If the combined data does not yield any suitable candidate files (decision block 1365), a restore request may be sent to a backup server (block 1380) and a conventional restoration process executed (block 1385). If the combined data does yield any suitable candidate files (decision block 1365), a list of the corresponding files that are available for restoration may be presented to the user (block 1370). The user may then select a file to be restored and the restoration may proceed using the identified matching blocks (block 1375).

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
one or more hosts, wherein at least one of said one or more hosts includes a backup agent;
wherein in response to a request to restore a file from a backup medium to a first host, the file being stored on the backup medium, a backup component is configured to:
determine whether there exists a copy of at least a portion of the file stored on a second host, the copy being different from the file stored on the backup medium;
in response to determining the copy does exist:
retrieve the copy of the at least a portion of the file; and
restore the file on the first host using at least said copy;
in response to determining the copy does not exist:
retrieve the file from the backup medium; and
restore the file on the first host using the file retrieved from the backup medium.

2. The system as recited in claim 1,
wherein the backup component is further configured to maintain a catalog of entries corresponding to copies of one or more portions of files stored on the one or more hosts; and
wherein in response to a request to restore the file to a first host, the backup component is further configured to query the catalog to identify one or more candidate locations where copies of one or more portions of the file have been stored.

3. The system as recited in claim 2, further comprising at least one backup server configured to store copies of files on a backup medium, wherein the backup component comprises the at least one backup server and/or a backup agent located on the first host.

4. The system as recited in claim 2, wherein the backup component comprises a backup agent located on the second host.

5. The system as recited in claim 1, wherein the first and second hosts are the same host.

6. The system as recited in claim 2, wherein the backup component is further configured to:
detect a file attached to an e-mail message; and create an entry in the catalog corresponding to the file attached to the e-mail message, wherein the entry includes data identifying a source and/or one or more destination locations associated with the e-mail message.

7. The system as recited in claim 2, wherein the catalog comprises entries corresponding to at least one of:
copies of files stored during creation of a restore point on the host on which the backup component is located;
copies of files stored on a host separate from the host on which the backup component is located during a file transfer from the host on which the backup component is located.

8. The system as recited in claim 1,
wherein the file comprises said at least a portion and a second block;
wherein a copy of said second block is stored on a third host; and
wherein in response to a request to restore the first file to a first host, the backup component is further configured to:
identify one or more candidate locations where copies of said at least a portion and said second block have been stored;
retrieve copies of said at least a portion and said second block; and
restore the first file on the first host using at least said at least a portion and said second block.

9. A method comprising:
receiving a request to restore a file from a backup medium to a first host, the file being stored on the backup medium; and
in response to said request to restore:
determining whether there exists a copy of at least a portion of the file stored on a second host, the copy being different from the file stored on the backup medium;
in response to determining the copy does exist:
retrieving the copy of the at least a portion of the file; and
restoring the file on the first host using at least said copy;
in response to determining the copy does not exist:
retrieving the file from the backup medium; and
restoring the file on the first host using the file retrieved from the backup medium.

10. The method of claim 9, further comprising:
maintaining a catalog of entries corresponding to copies of one or more portions of files stored on one or more hosts; and
in response to a request to restore the file to a first host, querying the catalog to identify one or more candidate locations where copies of one or more portions of the file have been stored.

11. The method of claim 10, further comprising maintaining the catalog on a backup server and/or on the first host.

12. The method of claim 10, further comprising maintaining the catalog on the second host.

13. The method of claim 9, wherein the first and second hosts are the same host.

14. The method of claim 10, further comprising:
detecting a file attached to an e-mail message; and
creating an entry in the catalog corresponding to the file attached to the e-mail message, wherein the entry includes data identifying a source and/or one or more destination locations associated with the e-mail message.

15. The method of claim 10, wherein the catalog comprises entries corresponding to at least one of:
copies of files stored during creation of a restore point on the host on which the backup component is located;
copies of files stored on a host separate from the host on which the backup component is located during a file transfer from the host on which the backup component is located.

16. The method of claim 9,
wherein the file comprises said at least a portion and a second block;
wherein a copy of said second block is stored on a third host; and
in response to a request to restore the first file to a first host:
identifying one or more candidate locations where copies of said at least a portion and said second block have been stored;
retrieving copies of said at least a portion and said second block; and
restoring the first file on the first host using at least said at least a portion and said second block.

17. A computer readable medium storing computer instructions that are executable by a processor to:
receive a request to restore a file from a backup medium to a first host, the file being stored on the backup medium; and
in response to said request to restore:
determine whether there exists a copy of at least a portion of the file stored on a second host, the copy being different from the file stored on the backup medium;
in response to determining the copy does exist:
retrieve the copy of the at least a portion of the file; and
restore the file on the first host using at least said copy;
in response to determining the copy does not exist:
retrieve the file from the backup medium; and
restore the file on the first host using the file retrieved from the backup medium.

18. The computer readable medium as recited in claim 17, wherein the instructions are further executable to:
maintain a catalog of entries corresponding to copies of one or more portions of files stored on one or more hosts; and
in response to a request to restore the file to a first host, query the catalog to identify one or more candidate locations where copies of one or more portions of the file have been stored.

19. The computer readable medium as recited in claim 17,
wherein the file comprises said at least a portion and a second block;
wherein a copy of said second block is stored on a third host; and
wherein in response to a request to restore the first file to a first host, the instructions are further executable to:
identify one or more candidate locations where copies of said at least a portion and said second block have been stored;
retrieve copies of said at least a portion and said second block; and
restore the first file on the first host using at least said at least a portion and said second block.

20. The computer readable medium as recited in claim 17, wherein the first and second hosts are the same host.

* * * * *